Sept. 28, 1926.　　　　　　　　　　　　　　　1,600,989
A. J. MEYER
TIRE CONSTRUCTION
Filed May 18, 1923　　　　3 Sheets-Sheet 1

Inventor
AUGUST J. MEYER,
By Albert C. Bill
Attorney

Sept. 28, 1926.     A. J. MEYER     1,600,989
TIRE CONSTRUCTION
Filed May 18, 1923     3 Sheets-Sheet 2

Inventor
AUGUST J. MEYER
By Albert C. Bell
Attorney

Inventor
AUGUST J. MEYER
By Albert C. Bell
Attorney

Patented Sept. 28, 1926.

1,600,989

UNITED STATES PATENT OFFICE.

AUGUST J. MEYER, OF CHICAGO, ILLINOIS.

TIRE CONSTRUCTION.

Application filed May 18, 1923. Serial No. 639,769.

My invention relates to an improved construction of automobile tire and improved means for mounting said tires on wheel rims. My invention is characterized by forming the tire of rubber compound so that air cells extend circumferentially in the tire without requiring that the air in the air cells shall be under other than atmospheric pressure. With this construction I provide mounting devices for holding all portions of the tire in expanded condition normally, that is, when no load is placed upon the tire, the mounting devices being so conformed that the circumferential air cells are maintained and prevented from collapsing for this expanded condition of the entire structure of the tire; and at the same time providing by the structure of the tire, that the air cells referred to are maintained and that the tire is prevented from collapsing when the load on the tire presses it against a roadway or supporting surface sufficiently to overcome the normal stresses of expansion of the tire; this leaves the structure of the tire at the place of application of the supporting pressure, in substantially neutral condition as regards internal stresses and in that way makes it responsive to a maximum degree to irregularities in the supporting surface or roadway. In this way I secure a maximum cushioning effect, which is comparable to that of well known pneumatic tires, without using air under pressure in the tire in any way to maintain the tire in distended condition. My improved tire construction is of the so called "solid tire" class, the material of the tire being so disposed as to secure a maximum of cushioning effect due to the arrangement of the circumferential air cells referred to, the material of the tire being so disposed as to support the load required to be carried by the tire, without materially deforming the tire section, with the result that a minimum of rubber compound is required thus making a tire section comparable in weight with the tire section of a pneumatic tire.

A further result secured by my improved construction is that the application of load to the tire is effective in distributing the supporting pressure throughout the whole tire circumferentially, instead of localizing the supporting pressure upon the supported portion of the tire, as is usually the case.

My invention will best be understood by reference to the accompanying drawings showing preferred embodiments thereof in which.

Similar numerals refer to similar parts throughout the several views.

Figure 1:
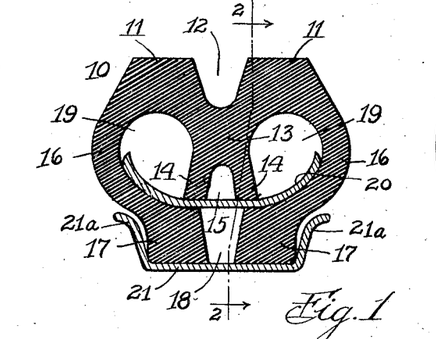
Fig. 1 is a cross sectional view of one embodiment of my tire and supporting devices.

As shown in Fig. 1, the tire section 10 consists of two circumferential tread portions 11, 11 between which an annular groove 12 is formed and from the tread portions, in the plane of the groove 12, an annular rib 13 projects inwardly towards the center of the tire, said rib terminating in annular supporting portions 14, 14 separated at their inner edges by an annular groove 15. From the outer edges of the tread portions 11, 11 the side portions 16, 16 of the tire diverge axially of the tire and extend inwardly radially of the tire and terminate at their inner edges in main supporting flanges 17, 17 of annular conformation which, when mounted upon the main supporting ring, have an annular space 18 between them in the plane of the rib 13. The conformation of the tire referred to results in forming circumferential air cells 19, 19, one on either side of the rib 13 and in the planes of the tread portions 11, 11, extending entirely around the tire. The rib 13 is supported in expanded condition, thus expanding the tread portions 11, 11, by intermediate supporting devices comprising a metal ring 20 upon which the inner edges of the flange portions 14, 14 of the rib rest. The ring 20 rests upon the edge flanges 17, 17 of the tire, which serve to support the ring 20, and the edge flanges 17, 17 are held towards each other and in expanded condition radially by the main supporting ring 21, which is flanged as indicated at 21ª, 21ª to retain the edge flanges 17, 17 in place, said ring 21 being preferably of metal.

Figure 2:
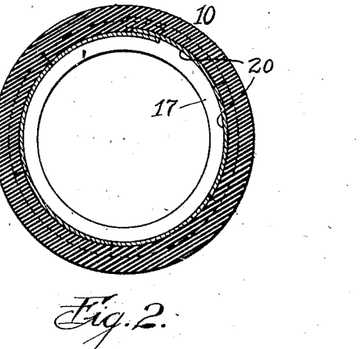
Fig. 2 is a sectional view through the parts shown in Fig. 1, to a reduced scale, taken along the line 2—2, the only difference being that in Fig. 2 the main supporting ring of the tire is omitted and the intermediate supporting devices are shown in compressed condition with the material of the tire in unexpanded condition.
Figure 3:
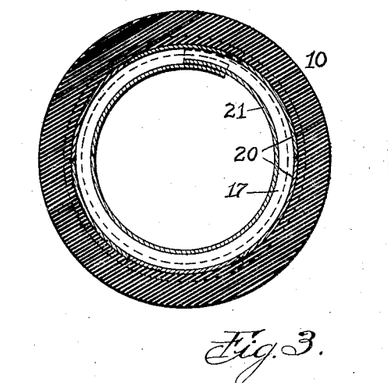
Fig. 3 shows in a view similar to Fig. 2 the intermediate supporting mechanism in expanded condition, expanding the central portion of the tire and with the main supporting ring in compressed condition.
Figure 4:
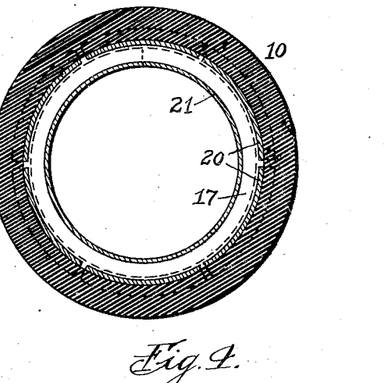
Fig. 4 shows in a view similar to Fig. 2 the main supporting ring in expanded condition and the intermediate supporting devices in the relation they occupy with the structure of the tire shown in Fig. 1, in fully expanded condition ready for use.

In mounting the tire shown in Fig. 1 for use, the ring 20, which is preferably sectional as indicated in Fig. 2, to facilitate inserting it in place between the flanges 14, 14 and the flanges 17, 17, is placed in the position indicated in Fig. 2, with the ends of adjacent sections of the ring overlapping at one point. The ring 20 is then expanded to bring its overlapping ends into abutting relation with each other, as indicated in Fig. 3, for which condition the flanges 14, 14 are slightly compressed and the rib 13, the treads 11, 11 and the side walls 16, 16 are expanded somewhat and subjected to corresponding internal stresses. For this condition of the mounting means, the ring 21 is placed within the flanges 17, 17, said ring 21 being preferably split at one point to facilitate overlapping its ends to place the ring in position within the flanges 17, 17 as indicated in Fig. 3. The ring 21 is then expanded to move it to the position shown in Fig. 4, thus exerting a pressure on the inner surfaces of the flanges 17, 17, which in turn exerts an outwardly directed pressure on the ring 20 sufficient to move it outwardly beyond the position indicated in Fig. 3, with the result that clearance spaces are left between the ends of the sections of the ring 20, and the flanges 14, 14 are further compressed to exert increased outer pressure on the rib 13 and the treads 11, 11 and side portions 16, 16, thus further expanding the parts of the tire. The tire is preferably so proportioned that when in fully expanded condition, corresponding to mounting it as indicated in Figs. 1 and 4, the application of the load for which the tire is intended, will compress the tread portions sufficiently to practically compensate for the expanded condition of the tread portions, thus leaving the tread portions and the adjacent side portions of the tire substantially free from internal stresses and the tire is therefore in a condition to be most sensitive to changes in pressure on the tire due to irregularities in the roadway and a maximum cushioning effect is secured. It will be observed that the application of the load to the tire and the resulting pressure of the tire on a supporting surface, places the pressure on the rib 13 and the side member 16, 16 and that the pressure exerted upon the tire is divided between the tread portions 11, 11 and is thus applied to the tire in planes through the air cells 19, 19. Also that the rib 13, by having its projecting flanges 14, 14 in planes extending through the inner edge portions of the flanges 17, 17, gives substantial support to the inner edge portions of the tread portion 11, 11 of the tire, the outer edge portions of which are similarly supported by the side members 16, 16 of the tire. It will also be observed that the annular groove 15 between the flanges 14, 14, materially reduces the cross section of the flanges 14, 14 relatively to the cross section of the rib 13, which results in compressing the material of the flanges 14, 14 to a greater extent than the material of the rib 13 is expanded, due to the manner of mounting the tire, and that therefore variations in pressure upon the tread portions 11, 11, are communicated in large part to the flanges 14, 14, the rib 13 being less expanded and therefore in condition to communicate a large part of the variations in the forces applied, to the flanges 14, 14. The groove 15 therefore materially improves the cushioning action of the tire from what it would be if the groove were not provided in the rib portion thereof. It will also be observed that the expansive force exerted upon the flanges 17, 17 by the main mounting ring 21 is opposed in considerable measure by the inwardly directed radial forces exerted upon the flanges 17, 17 by the ring 20, and the compressive action resulting from this relation tends to hold the flanges 17, 17 securely in place on the flanged ring 21.

Figure 5:
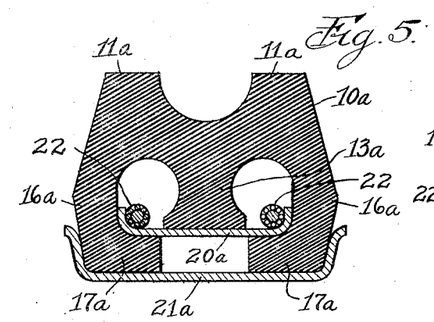
Fig. 5 shows in a view similar to Fig. 1, a modified cross section of tire with devices for clamping the intermediate supporting means to the main supporting ring of the tire to somewhat more positively clamp the tire to the main supporting ring than is the case with the construction shown in Fig. 1.

In the modified construction shown in Fig. 5 the tire $10^a$ is of somewhat similar cross section to the tire 10 shown in Fig. 1, the only difference being that the proportions and conformation of the parts of the tire are somewhat different from those shown in Fig. 1 and that the rib $13^a$ is solid instead of being provided with an annular groove 15 as shown in Fig. 1. In this construction the tire is provided with an intermediate mounting ring $20^a$, similar to the ring 20 shown in Fig. 1, and with a main mounting ring $21^a$, similar to the mounting ring 21 shown in Fig. 1. With the construction of Fig. 5 however, which is intended for heavier loads than that shown in Fig. 1, I prefer to use additional devices to hold the tire on the ring $21^a$, consisting of cables 22, 22 surrounding the edge portions of the ring $20^a$, said cables being annular and of a length to restrain the ring $20^a$ against expansion beyond a predetermined limit, when the ring $21^a$ is expanded in the manner described above for the construction shown in Figs. 1-4 inclusive, to hold the ring $20^a$ firmly against the flanges $17^a$, $17^a$ of the tire, and thus provide a sufficient clamping action between the rings $20^a$ and $21^a$ to positively hold the flanges $17^a$, $17^a$ in the position indicated on the ring $21^a$. The cables 22, 22 it will be understood are endless rings formed by securing the ends of lengths of cable together in any suitable manner, for example by splicing or otherwise, the sole function of these rings being to prevent expansion of the ring $20^a$ beyond a position for clamping the flanges $17^a$, $17^a$ between said ring and the ring $21^a$, but at the same time permitting sufficient expansion of the ring $20^a$ to secure expansion of the tire corresponding to that above described for the similar construction shown in Figs. 1-4 inclusive. The reason for using cables to form the retaining rings 22, 22 is that the retaining rings may be flexible enough to be readily inserted in the tire. It will be understood that these retaining rings may be made in any suitable manner and of any suitable material, for example soft iron or other metal, having their ends secured together in any convenient manner, whether stranded in the form of a cable or not, as long as the rings are of sufficient strength to withstand the clamping action described and are sufficiently flexible to be inserted in the tire in the position indicated.

In other respects than particularly described, the construction of Fig. 5 is similar to that shown in Fig. 1 and operates in the same manner.

Figure 6:
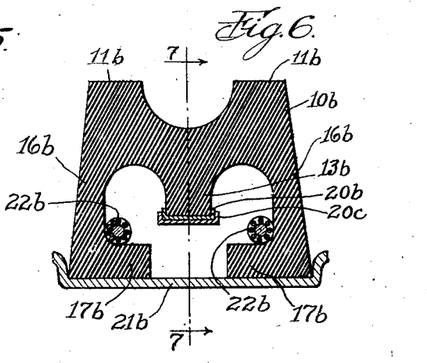
Fig. 6 shows in a view similar to Fig. 5, a modified cross section of tire in which the intermediate supporting means are independent of the retaining devices for holding the tire in place on the main supporting ring, so that the intermediate supporting devices are free to transmit the supporting pressure to all parts of the tire.

In the modified tire construction shown in Fig. 6 the general cross section of the tire $10^b$ is similar to that shown in Fig. 5, the principal difference being that the rib $13^b$ is of larger internal diameter proportionally than the corresponding rib shown in Fig. 5 and that it is held in expanded relation by a sectional metal ring $20^b$ having outwardly extending edge flanges, the sections of which ring are held in expanded condition by a solid continuous inner metal ring $20^c$ also provided with outwardly extending edge flanges, both of the rings $20^b$ and $20^c$ however, being narrow enough so that they do not engage the flanges $17^b$, $17^b$, as a result of which the said rings are independent of any connection with the tire flanges and form a floating support for the tire rib, the relation of the parts permitting the said rings to move radially from the unloaded position shown in Fig. 6 between the edges of the flanges $17^b$, $17^b$ in any case where the loading or unevenness of the roadway sufficiently indent the part of the tire engaged by the supporting surface, to cause corresponding displacement between the tread portion of the tire and the main mounting ring $21^b$.

In this construction the tire flanges are supported on a main mounting ring $21^b$ of the expansion type above described, in substantially the manner described for the construction shown in Fig. 5, and retaining rings $22^b$, $22^b$ are provided around the inner surfaces of said flanges 17$^b$, 17$^b$ operating in the same manner to secure the same result as far as clamping the tire flanges is concerned, as described above in connection with the construction shown in Fig. 5. The retaining rings 22$^b$, 22$^b$ are constructed in the same manner as described for the similar rings in connection with Fig. 5.

Figure 7:
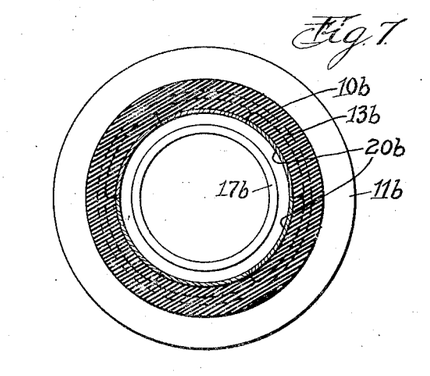
Fig. 7 is a sectional view of the construction shown in Fig. 6 to a reduced scale taken along the line 7—7 with a part of the intermediate supporting mechanism in place before the tire is mounted on the main supporting ring, the expanded condition of the tire corresponding to that indicated in Fig. 3.
Figure 8:
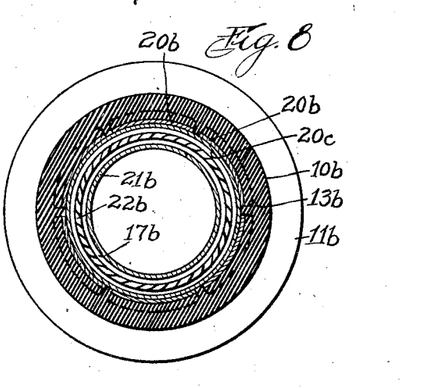
Fig. 8 shows in a view similar to Fig. 7 the tire structure of Fig. 6 in fully expanded condition with the inner member of the intermediate supporting means in place and the main supporting ring in expanded condition.

In mounting the tire shown in Fig. 6, the sections of the ring 20$^b$ are first put in place upon the inner edge of the rib 13$^b$ and are expanded sufficiently to place the ends of all of the sections of said ring in abutting relation as shown in Fig. 7, for which condition the tire is somewhat expanded as described above in connection with Fig. 3. The inner ring 20$^c$ is then put in place inside of the ring 20$^b$ by further expanding the latter by any suitable means, and when the ring 20$^c$ is in place, the sections of the ring 20$^b$ are preferably held in somewhat separated relation as indicated in Fig. 8, this condition corresponding to the condition of the tire shown and described in connection with Fig. 4 as far as the rib 13$^b$ and the tread portions 11$^b$, 11$^b$ and side portions 16$^b$, 16$^b$ of the tire, are concerned. After the ring 20$^c$, which as stated is preferably continuous, is in place, its edge flanges prevent displacement of said ring on the ring 20$^b$ and the edge flanges of the ring 20$^b$ prevent displacement of both rings laterally on the rib 13$^b$. After the ring 20$^c$ is in place as described, the retaining rings 22$^b$, 22$^b$ are inserted in the tire and flanges 17$^b$, 17$^b$ are expanded against said rings in the manner above described for the construction of Fig. 5.

As a result of the construction last described, any displacement of the tread portion of the tire from its normal or unloaded position shown in Fig. 6, is effective in displacing the entire rib portion 13$^b$ of the tire and its supporting rings, radially of the tire with the result that the pressure exerted upon the tread portion is transmitted by the rib portion of the tire, to the entire tire circumferentially and is distributed over the entire rib portion and the entire side portions 16$^b$, 16$^b$. In this way the detrimental effect of compression of the tire by a load is very much reduced and the resilient action of the tire is materially increased over what would be the case if the rib 13$^b$ were prevented from radial displacement relatively to the remaining portions of the tire.

Figure 9:
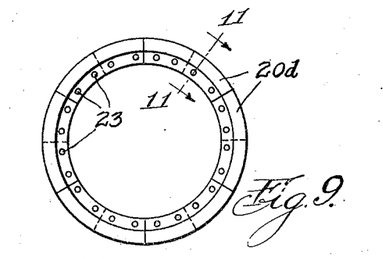
Fig. 9 shows in side elevation to a reduced scale a modified construction of intermediate supporting mechanism for a tire of the construction shown in Fig. 6.
Figure 10:
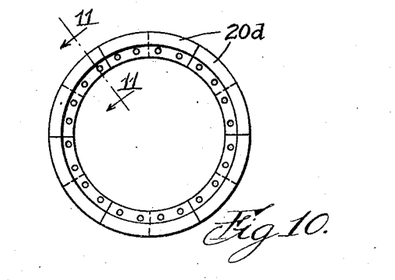
Fig. 10 shows in a view similar to Fig. 9 the reverse side of the intermediate supporting mechanism shown in Fig. 9.
Figure 11:
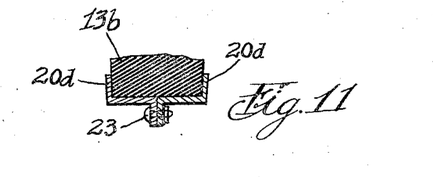
Fig. 11 is a sectional view through the construction shown in Figs. 9 and 10, taken along the line 11—11.

In Figs. 9, 10, and 11, I show a modified construction of rib supporting ring 20$^d$ for supporting the rib 13$^b$ of a tire of the construction shown in Fig. 6. This modified ring construction consists of a plurality of Z-shaped sections provided with flanges extending on one edge outwardly and the other edge inwardly. The sections of the ring are assembled in reversed relation as indicated in Figs. 9 and 10 so that a groove is formed between the outwardly extending flanges, and the inwardly extending flanges are adjacent each other and furthermore the sections on one side of the ring overlap the sections on the other side of the ring longitudinally. The sections of the ring are secured together by suitable fastening devices, for example bolts or rivets 23 as indicated, these fastening devices being preferably inserted after the sections of the ring have been assembled and in expanded condition in place on the rib 13$^b$.

If preferred, the ring 20$^b$ may be completely assembled on the ring 20$^c$ before inserting said rings in the tire, as the clearance openings on either side of the rib 13$^b$ will permit insertion of the rings into the tire with but little springing of the flanges 17$^b$, 17$^b$ and for this manner of mounting, the rib 13$^b$ is expanded by any convenient means to place the ring within it. If desired the ring 20$^d$ may be assembled and put in place on the tire rib in the manner just described.

Figure 12:
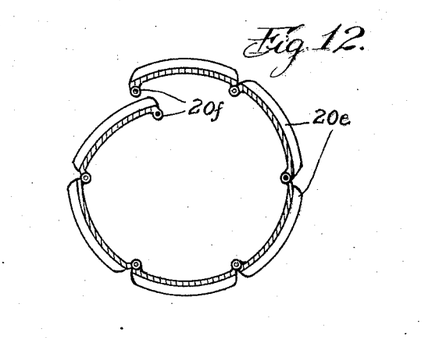
Fig. 12 shows partially in side elevation and partially in section, a modified construction of intermediate supporting mechanism.

In Fig. 12 I show a modified type of rib supporting ring 20$^e$ for use with the tire construction shown in Fig. 6, this ring consisting of a plurality of sections pivotally connected at their ends, which accomplishes two purposes: first, it permits the ring to be inserted into the tire more readily than a ring of the ordinary expanding type, and upon expansion of the ring in place on the rib, it permits the end sections of the ring to be secured together by a removable pivot connection. With the removable pivot connection inserted through the openings in the lugs 20$^f$, 20$^f$, the ring has a second advantage of being rigid as far as holding the tire rib outwardly is concerned and at the same time permitting sufficient deformation of the ring from a circular condition to facilitate communicating the pressure upon the tread portion to all portions of the tire rib.

Figure 13:
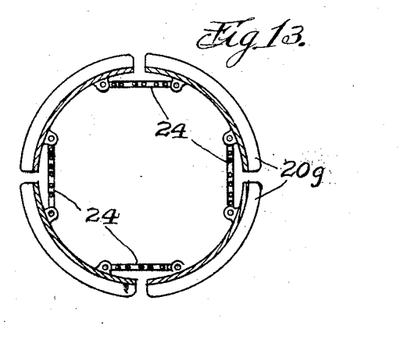
Fig. 13 shows in a view similar to Fig. 12 a further modified construction of intermediate supporting mechanism.

In Fig. 13 I show a modified construction of ring 20$^g$ adapted for use with a tire of the type shown in Figs. 1 and 5. This construction consists of a plurality of sections as indicated, connected at their end portions by short chains 24, 24, which permit the ready collapse of the ring to insert it in the tire and then serve to prevent expansion of the ring beyond a predetermined amount when the main supporting ring is expanded in mounting the tire. In this way the ring 20$^g$ prevents expansion of the tire flanges beyond a predetermined amount and serves to positively clamp the tire flanges between it and the main supporting ring, without the use of the retaining rings or cables above described.

Figure 14:
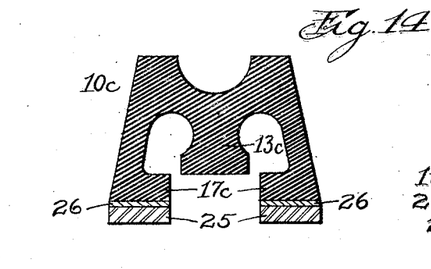
Fig. 14 shows in cross section, a modified form of tire in which the tire is permanently secured to main supporting rings, this view showing the mid portion of the tire in unexpanded condition.
Figure 15:
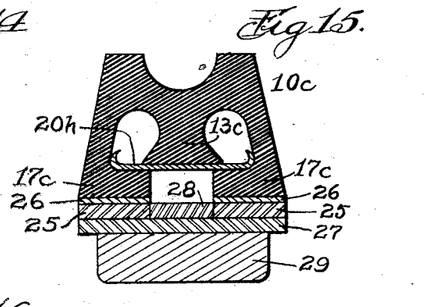
Fig. 15 shows in a view similar to Fig. 14 the tire construction shown in Fig. 14. with the mid portion of the tire in expanded condition by means of intermediate supporting devices and with the tire in place on a supporting wheel rim.

In the construction of tire shown in Fig. 14, the tire flanges 17$^c$, 17$^c$ are vulcanized on metal rings 25, 25 during the manufacture of the tire, the vulcanizing compound being indicated at 26, 26, so that the tire may subsequently be mounted on a main supporting ring 27 as shown in Fig. 15 and held in place on said ring by any suitable fastening devices, not shown. As indicated in Fig. 15 a spacing ring 28 is preferably employed between the rings 25, 25 to prevent their being forced too closely together in mounting them on the ring 27. The rings 25, 25 and the mounting ring 27 may be sectional or solid and continuous, as preferred. The rib 13$^c$ of the tire 10$^c$ shown in Figs. 14 and 15, is held outwardly in expanded condition by a ring 20$^h$, similar to the ring 20 above described in connection with Fig. 1, and with substantially the same results. In Fig. 15 a wheel rim 29 is shown supporting the main mounting ring 27, the parts being secured together in any desired manner not shown.

Figure 16:
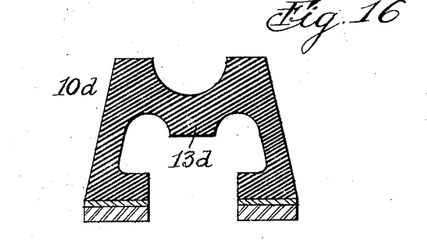
Fig. 16 shows in a view similar to Fig. 14 a modification form of tire provided for floating or independent support by the intermediate supporting means, of the mid portion of the tire.
Figure 17:
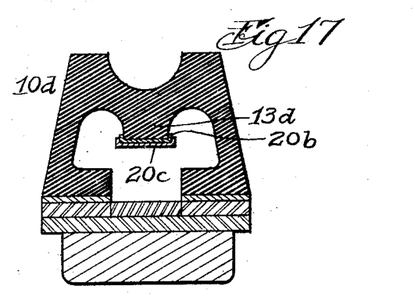
Fig. 17 shows in a view similar to Fig. 15, the tire section shown in Fig. 16 in fully expanded condition.

The construction of the tire 10$^d$ shown in Figs. 16 and 17 is substantially the same as that shown in Figs. 14 and 15, with the exception that the rib 13$^d$ of the tire is of the type shown in Fig. 6 and similarly supported by rings 20$^b$ and 20$^c$, with substantially the same results described in connection with Fig. 6. It will be understood that the supporting ring shown in Figs. 9 to 12 inclusive, may be used with the tire construction shown in Figs. 16 and 17.

Figure 18:
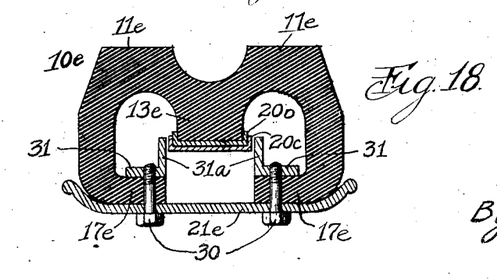
Fig. 18 shows a section of tire similar to Fig. 6, with a modified construction of devices for retaining the tire on the main supporting ring of the tire.

In Fig. 18, I show a tire construction 10$^e$ similar as to its rib construction 13$^e$ and the support of the same, to that shown in Figs. 16 and 17. In this construction however, the tire flanges 17$^e$, 17$^e$ are held securely upon the main supporting ring 21$^e$ by screws or bolts 30 extending through the ring 21$^e$ and said flanges into threaded engagement with metal ring sections 31 engaging the inner surfaces of said tire flanges to hold them tightly in clamped relation against the main supporting ring 21$^e$. With this construction the ring 21$^e$ may be continuous or if preferred of the expanding type, and in the latter case the results secured are substantially the same as described above in connection with Fig. 6. As indicated, the ring sections 31 may be provided with outwardly extending flanges 31$^a$ on their inner edges, of slightly greater external diameter than the ring 20$^c$, to form a guideway for the said ring 20$^c$ preventing lateral displacement of the rib 13$^e$, and therefore reinforcing the tire against deformation due to side thrusts.

From the above description it will appear that I provide a tire construction in which all portions of the tire are normally under stress in such a manner that the application of pressure to the tire in supporting a load, relieves the stress and places the material of the tire in a more responsive condition to variations of pressure upon it and furthermore that the pressure applied is distributed throughout the tire giving greater resilience to the tire, than would be the case if the applied pressure remained localized. It will also be observed that the rib construction employed throughout, maintains a desired relation of expansion between the tread portions of the tire and the flange portions at all times and in this manner maintains the annular air cells provided in the tire, of such cross section that they afford a condition of maximum resilience of the tread portions of the tire at all times, in this manner undue flattening of the tire under load is avoided and the pressures exerted upon the tire by loads placed upon it, are transmitted to the parts of the tire most effective in withstanding these pressures and affording resilient action under them.

While I have shown my invention in the particular embodiments above described, it will be understood that I do not limit myself to this exact construction as I may employ equivalents known to the art at the time of the filing of this application without departing from the scope of the appended claims.

What I claim is:

1. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges.

2. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges and holding the same in expanded condition.

3. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges, said inner ring being expanded to expand said rib.

4. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges, said main mounting ring being expanded to expand said flanges.

5. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges, said inner ring comprising sections movable relatively to each other and expanded to expand said rib.

6. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, a main mounting ring supporting said flanges, and retaining rings around said flanges holding them in clamping engagement with said main mounting ring.

7. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, a main mounting ring supporting said flanges and holding the same in expanded condition, and retaining rings around said flanges holding them in clamping engagement with said main mounting ring.

8. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, a main mounting ring supporing said flanges, said main mounting ring being expanded to expand said flanges, and retaining rings around said flanges holding them in clamping engagement with said main mounting ring.

9. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges, said rib and said inner ring being free from said flanges and said main supporting ring.

10. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges and holding the same in expanded condition, said rib and said inner ring being free from said flanges and said main supporting ring.

11. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges, said inner ring being expanded to expand said rib, said rib and said inner ring being free from said flanges and said main supporting ring.

12. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges, said main mounting ring being expanded to expand said flanges, said rib and said inner ring being free from said flanges and said main supporting ring.

13. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges, said inner ring comprising sections movable relatively to each other and expanded to expand said rib, said rib and said inner ring being free from said flanges and said main supporting ring.

14. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, a main mounting ring supporting said flanges, and retaining rings around said flanges holding them in clamping engagement with said main mounting ring, said rib and said inner ring being free from said flanges and said main supporting ring.

15. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges, said inner ring comprising a first annular portion in sections expanded to expand said rib and a second continuous annular portion holding the sections of said first portion in expanded condition and free from said tire flanges and said main supporting ring.

16. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, a main mounting ring supporting said flanges, said rib and said inner ring being free from said flanges and said main supporting ring, and guide flanges preventing lateral displacement of said inner ring and said rib relatively to said edge flanges.

17. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, a main mounting ring supporting said flanges, said inner ring comprising sections movable relatively to each other and expanded to expand said rib and free from said tire flanges and said main supporting ring, and guide flanges preventing lateral displacement of said inner ring and said rib relatively to said edge flanges.

18. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, a main mounting ring supporting said flanges, said inner ring comprising a first annular portion in sections expanded to expand said rib and a second continuous annular portion holding the sections of said first portion in expanded condition and free from said tire flanges and said main supporting ring, and guide flanges preventing lateral displacement of said inner ring and said rib relatively to said edge flanges.

19. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, a main mounting ring supporting said flanges, said inner ring comprising a first annular portion in sections expanded to expand said rib and a second continuous annular portion holding the sections of said first portion in expanded condition and free from said tire flanges and said main supporting ring, said annular portions having edge flanges holding them in assembled relation on said rib, and guide flanges preventing lateral displacement of said inner ring and said rib relatively to said edge flanges.

20. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges, said inner ring comprising a first annular portion in sections expanded to expand said rib and a second continuous annular portion holding the sections of said first portion in expanded condition.

21. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, and a main mounting ring supporting said flanges, said inner ring comprising a first annular portion in sections expanded to expand said rib and a second continuous annular portion holding the sections of said first portion in expanded condition, said annular portions having edge flanges holding them in assembled relation on said rib.

22. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, a main mounting ring supporting said flanges, clamping segments inside of said edge flanges, and devices extending through said main supporting ring and said segments holding them in clamping relation.

23. In a tire construction, the combination of a tire of rubber compound having a tread portion, an annular rib extending inwardly from said tread portion, and side members extending inwardly from said tread portion and having edge flanges, an inner ring supporting said rib and holding the same in expanded condition, a main mounting ring supporting said flanges, clamping segments inside of said edge flanges, and devices extending through said main supporting ring and said segments holding them in clamping relation, said rib and said inner ring being free from said flanges and said main supporting ring.

24. In a tire construction, the combination of a tire of rubber compound having inwardly extending side portions and a rib projecting inwardly between and separated from said side portions, and a ring within said rib holding it in expanded condition.

25. In a tire construction, the combination of a tire of rubber compound having inwardly extending side portions and a rib projecting inwardly between and separated from said side portions, and a ring within said rib holding it in expanded condition, said rib and ring being free from the remaining parts of the structure.

26. In a tire construction, the combination of a tire of hollow cross section having an inwardly projecting annular rib, and a ring within said rib holding it in expanded condition.

27. In a tire construction, the combination of a tire of hollow cross section having an inwardly projecting annular rib, and a ring within said rib holding it in expanded condition, said rib and ring being free from the remaining parts of the structure.

28. In a tire construction, the combination of a tire of hollow cross section having an inwardly projecting annular rib, and a ring of larger diameter than the smallest diameter of the tire holding said rib in expanded condition.

29. In a tire construction, the combination of a tire of hollow cross section having an inwardly projecting annular rib, and a ring of larger diameter than the smallest diameter of the tire holding said rib in expanded condition, said rib and ring being free from the remaining parts of the structure.

In witness whereof, I hereunto subscribe my name this 12th day of May, A. D. 1923.

AUGUST J. MEYER.